(12) United States Patent
Shah

(10) Patent No.: US 7,188,081 B1
(45) Date of Patent: *Mar. 6, 2007

(54) ELECTRONIC SHOPPING BASKET

(75) Inventor: Darshatkumar Shah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

This patent is subject to a terminal disclaimer.

(21) Appl. No.: 09/699,961

(22) Filed: Oct. 30, 2000

(51) Int. Cl.
*G06Q 30/00* (2006.01)

(52) U.S. Cl. .............. 705/26; 705/14; 705/27

(58) Field of Classification Search ......... 705/26, 705/27, 14, 75; 707/4, 3; 725/116
See application file for complete search history.

(56) References Cited

U.S. PATENT DOCUMENTS

| | | | |
|---|---|---|---|
| 5,754,938 A * | 5/1998 | Herz et al. ............... | 725/116 |
| 5,895,454 A | 4/1999 | Harrington | |
| 5,946,665 A | 8/1999 | Suzuki | |
| 5,956,483 A | 9/1999 | Grate et al. | |
| 5,956,709 A * | 9/1999 | Xue ....................... | 707/3 |
| 5,966,697 A * | 10/1999 | Fergerson et al. ......... | 705/26 |
| 6,029,141 A * | 2/2000 | Bezos et al. .............. | 705/27 |
| 6,125,352 A * | 9/2000 | Franklin et al. ........... | 705/26 |
| 6,154,738 A * | 11/2000 | Call ........................ | 707/4 |
| 6,304,855 B1 * | 10/2001 | Burke ..................... | 705/27 |
| 6,490,602 B1 | 12/2002 | Kraemer | |
| 6,609,106 B1 * | 8/2003 | Robertson ................ | 705/26 |
| 6,611,814 B1 * | 8/2003 | Lee et al. ................. | 705/26 |
| 6,629,079 B1 * | 9/2003 | Spiegel et al. ............. | 705/26 |
| 6,850,899 B1 * | 2/2005 | Chow et al. .............. | 705/26 |
| 6,850,917 B1 * | 2/2005 | Hom et al. ............... | 705/75 |
| 6,868,393 B1 * | 3/2005 | Demsky et al. ........... | 705/26 |
| 6,925,444 B1 * | 8/2005 | McCollom et al. ........ | 705/14 |
| 2003/0018536 A1 * | 1/2003 | Eggebraaten et al. ...... | 705/26 |
| 2006/0015405 A1 * | 1/2006 | Bala et al. ................. | 705/14 |

FOREIGN PATENT DOCUMENTS

| | | |
|---|---|---|
| EP | 1598763 | 11/2005 |
| EP | 1598763 A1 * | 11/2005 |
| WO | WO 98/21679 * | 5/1998 |

OTHER PUBLICATIONS

Evans, Patricia; "Seybold report on Internet publishing"; Mar. 2000; extracted on Internet from Dialog, Accession # 02387567 on Jan. 9, 2004.*

(Continued)

*Primary Examiner*—Yogesh C. Garg
(74) *Attorney, Agent, or Firm*—Amin, Turocy, & Calvin, LLP

(57) ABSTRACT

A system which facilitates electronic shopping, which includes a graphical image component residing on a user interface; and a shopping basket component associated with the graphical image component. The shopping basket component provides drag and drop capabilities such that a user can drag and drop representations of identified items from a plurality of sources using a computer pointer into the graphical image and descriptions of the items will be retained by the shopping basket component. The system allows for a user to concurrently effect multiple transactions with disparate items respectively associated a plurality of sources.

12 Claims, 8 Drawing Sheets

OTHER PUBLICATIONS

"SalesLogix Announces All-in-One Portal Solution for Partner Relationship Management", Sep. 1, 1999; PR Newswire, p. 1,3 pp.*

Carol Sliwa, *Boo.com to Rise Again, Run by Fashonmall*, Computerworld, Aug. 21, 2000, p. 35.

Lori Mitchell, *User-friendly iBooks.com keeps IT staff's skills sharp*, InfoWorld, May 15, 2000, p. 62, 65.

Lori Mitchell, et al., *Test Center Comparison*, InfoWorld, Mar. 23, 1998, p. 72-83.

Howard Millman, *Build Internet Storefronts Instantly*, Info World, Feb. 24, 1997, pt. 1W/2.

Leslie Goff, *Practical Internet Sites for IS Managers*, Computerworld, Sep. 9, 1996, p. 84.

Ellis Booker, *Cybershoppers Cruise Past Internet Retailers*, Computerworld, Jan. 23, 1995, p. 1, 26.

Ellis Booker, *Web Services Snare Managers*, Computerworld, Jan. 9, 1995, p. 60.

"SalesLogix Announces All-in-One Portal Solution for Partner Relationship Management," Sep. 1, 1999; PR Newswire, p. 1, 3pp.

Leslie Walker; "Putting Search Tools to the Test; Second Generation of Shopping 'Bots' Ca Help Spot Bargains, When They Work," Nov. 21, 1999; The Washington Post, p.H.06, 2pp.

* cited by examiner

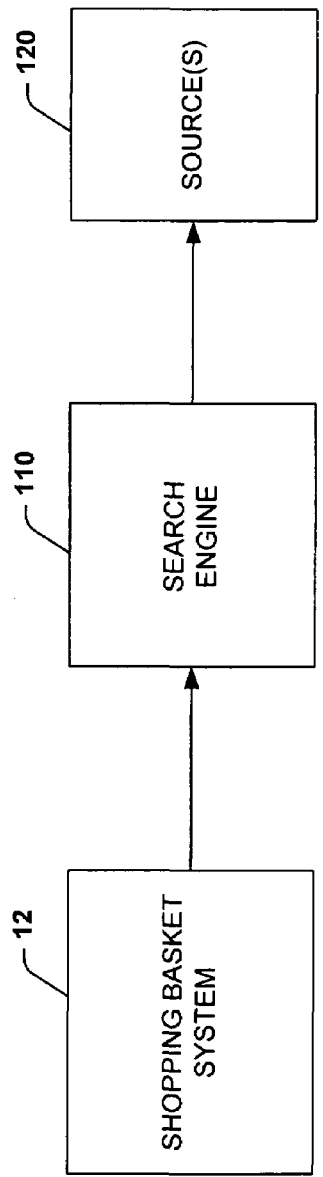

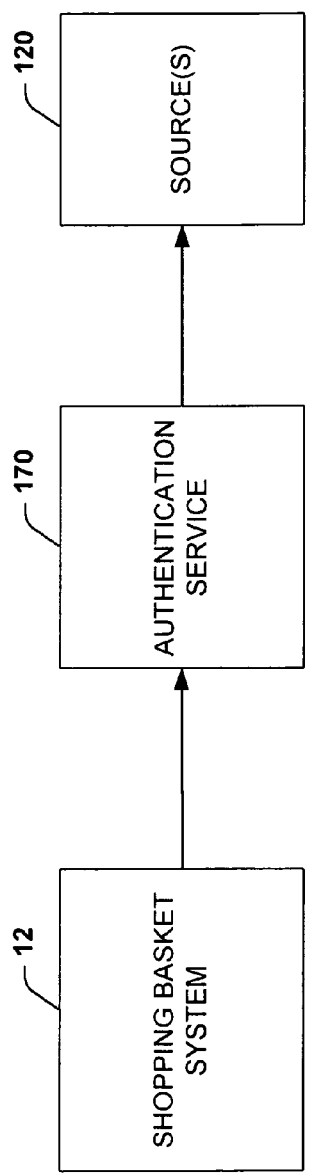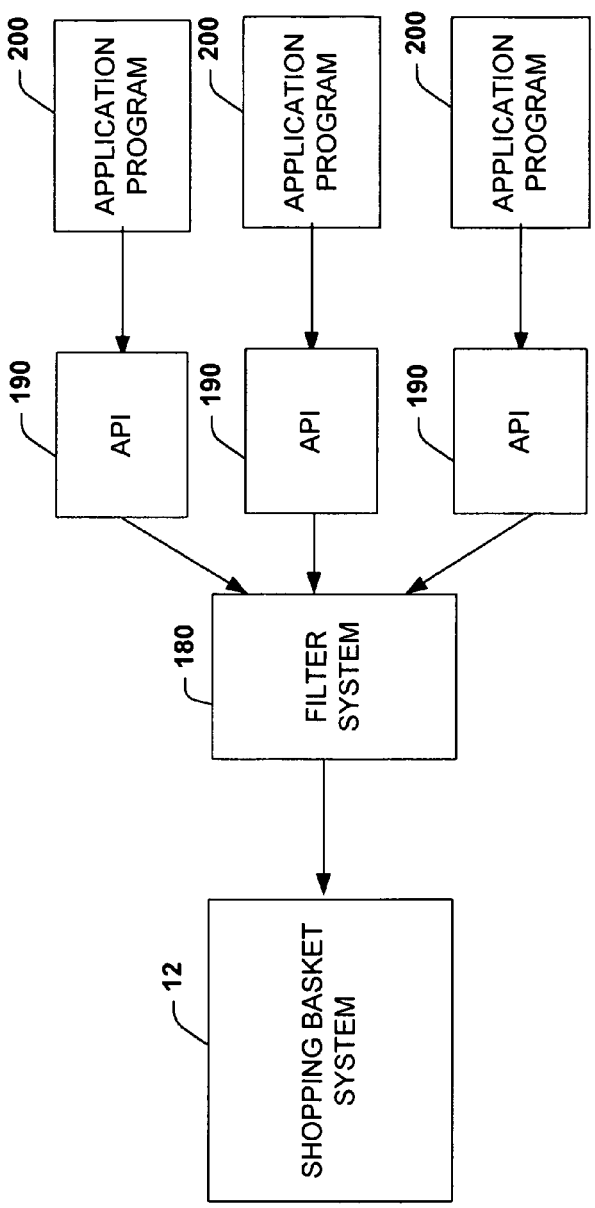

ELECTRONIC SHOPPING BASKET

TECHNICAL FIELD

The present invention relates to computer systems, and more particularly to a system and method for facilitating electronic commerce via the Internet.

BACKGROUND OF THE INVENTION

In recent years, there has been an increasing trend of the use of electronic shopping basket applications for providing an Internet user a mechanism in which to temporarily store goods and/or services prior to purchasing these goods and/or services electronically. Typically, these shopping cart applications reside on a Web server of a merchant or shopping site and are limited to use only on that particular site. A user can visit the merchant's web site and use the shopping cart application to purchase goods and/or services without having to enter the user's personal information multiple times for each transaction. The user must propagate the shopping basket each time the user desires to add a product or service to the shopping basket, for example, by clicking on a link describing the product and/or service. The link then accesses a database on the server where detailed information about the product and/or service is retrieved. The selected products can then be purchased, at that site only, concurrently or individually as desired.

Another recent application that has evolved is the gift list or wish list application. The gift list or wish list application allows a user to add product and/or services that the user desires to a list. The gift list or wish list is then available to others for viewing, so that others may purchase items on the list as a gift for the user. Again these gift or wish applications reside on a Web server of a merchant or shopping site and are limited to use only on the that particular site. Additionally, in both the shopping basket application and the wish list applications, only the user may access and modify products and/or services residing within the shopping basket and wish list.

Accordingly, there is an unmet need in the art for a system and method that mitigates the above stated deficiencies with traditional shopping carts and wish list applications.

SUMMARY OF THE INVENTION

The present invention provides for a system which facilitates electronic shopping. One aspect of the invention relates to a universal electronic shopping basket which may be associated with a desktop application and/or a browser application. A user can select items of interest from various locations (e.g., web sites) and place them in the universal shopping cart. The user may browse registered sites on the Internet and drag and drop products using a computer pointer (e.g., a mouse) into the user's electronic shopping basket. The drag and drop capability is provided by the programmability of the electronic shopping basket. A common schema can be used for describing items (e.g., products and services) to be purchased from registered sites. In one aspect of the invention the common schema is provided in the eXtensible Markup Language (XML). After all items of interest have been gathered and placed in the shopping cart, the user can concurrently order all items (e.g., employing an authentication service for secure communications). Components representative of the items will include data corresponding to source, price, date, item description and other data needed to close a transaction for purchase of the item(s). One particular advantage of this aspect of the invention is that the user only needs to make a single transaction to close purchasing deals with respect to a plurality of items associated with different sources.

Another aspect of the invention relates to an item list (e.g., a wish list or gift list), which may be associated with a universal shopping cart in accordance with the present invention. A user can add one or more particular items of interest to the item list, and the list may be programmatically accessed or queried by potential sources of the items (e.g., retailers). The user may also include additional information such as for example price the user is willing to pay for the item(s). If one or more of the potential sources determines that a match exists between the user's purchase requirements and the sources ability/desire to satisfy the purchase request, the source(s) can inform the user with respect thereto. In one aspect of the invention, the shopping basket system is programmable, such that any application program with permission may access the item list and add items to the user's shopping basket list if a match exists between the added item and an item in the item list. An application programs access to a user's shopping basket and/or item list may be based on one or more levels of trust. Alternatively and/or in combination, the shopping basket and/or the item list may be associated with a query/search system, which could search for and identify sources of the item(s) and determine if a match exists between the user and source. If a match exists, a menu can be provided to the user for adding the item to the user's shopping basket or item list.

In accordance with another aspect of the present invention, a filtering system may be employed in connection with the item list so as to limit the number of potential sources of items and/or mitigate spam type of responses to an item list posting and/or query/search.

A universal shopping cart and/or item list in connection with the present invention may be resident on a personal computing system, third party computing system, network, and any other suitable medium for carrying out the functionality described herein.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 4 illustrates an example of a search results screen in accordance with one aspect of the present invention.

FIG. 5 illustrates a block diagram of the interaction of components to provide search results in accordance with one aspect of the present invention.

FIG. 7 illustrates a block diagram of the interaction of components to provide concurrent purchasing in accordance with one aspect of the present invention.

FIG. 8 illustrates a block diagram of the interaction of components to provide programmability of the shopping basket system in accordance with one aspect of the present invention.

DETAILED DESCRIPTION OF THE INVENTION

Figure 1:
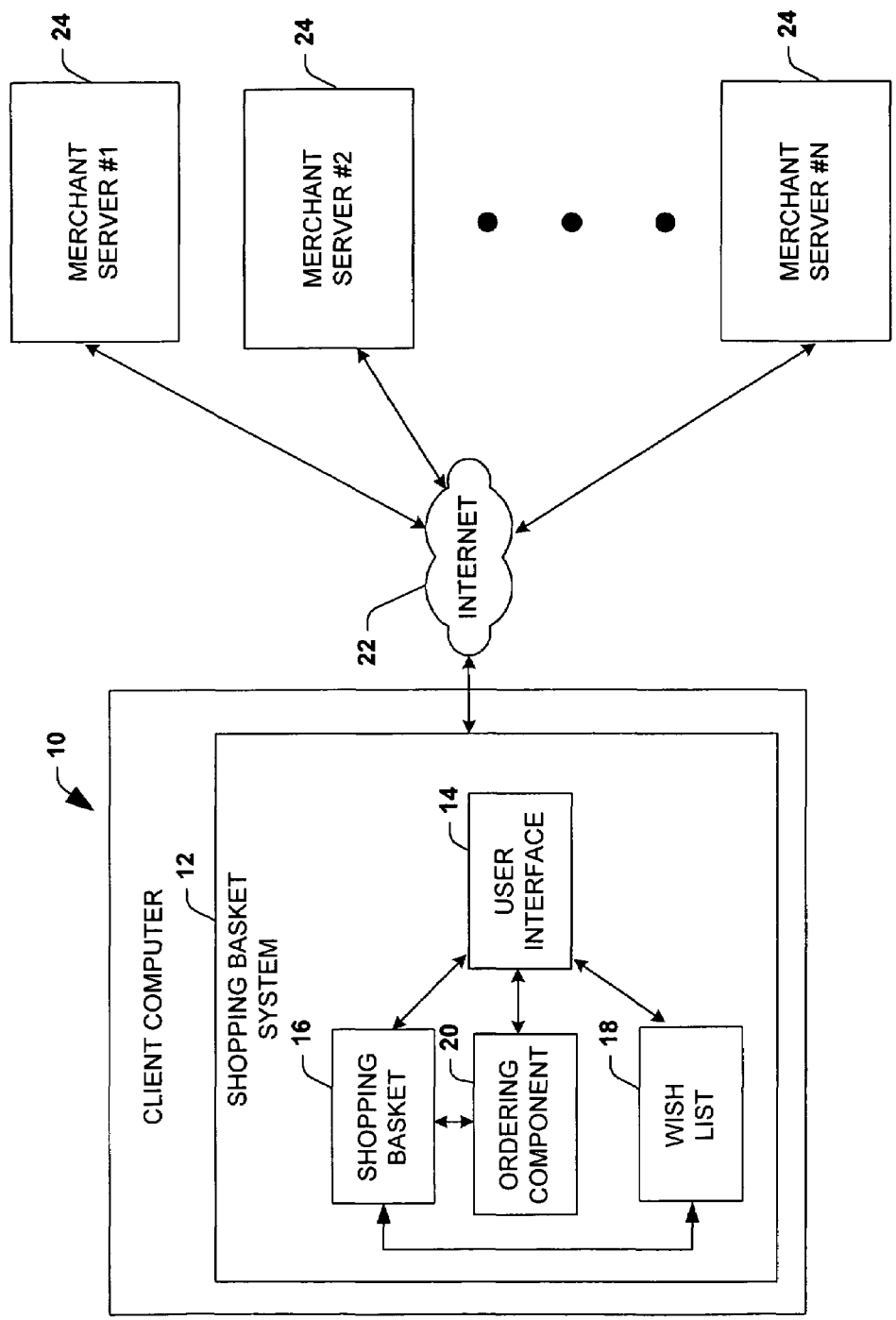
FIG. 1 illustrates a block diagram of a shopping basket system in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention is described with reference to a shopping basket system residing on a client computer and the methodologies employed to provide the functionality of the shopping basket system in accordance with the present invention. The shopping basket system includes a shopping basket component and a wish or gift list component. The functionality of the shopping basket system may be invoked via a graphical image, such as an icon, on a web browser or a desktop of the client computer. Alternatively, the shopping basket system may be invoked employing a selectable menu option. The user may browse registered sites on the Internet and drag and drop products into the user's shopping basket. All products may then be purchased concurrently regardless of the site where the product was found. The drag and drop capability is provided by the programmability of the shopping basket. A common schema can be employed for describing items (e.g., products and services) to be purchased from registered sites. In one aspect of the invention the common schema is provided in XML. The shopping basket system is provided with a search engine for searching for items on a user's wish or gift list over the Internet. The search results are provided to the user, which can be added to the user's shopping basket list. In one aspect of the invention, the shopping basket system is programmable, such that any application program with permission may access a user's shopping basket system and add items to the user's shopping basket based on items matching items found in a user's wish list.

FIG. 1 illustrates a client computer 10 employing a shopping basket system 12 of the present invention. The client computer 10 is linked to a plurality of registered merchants 24 over the Internet 22 via a communication link. The shopping basket system 12 includes a user interface component 14 coupled to a shopping basket component 16, an ordering component 20 and a wish list component 18. The user interface component may be a web browser or a desktop of a personal computer. The shopping basket component 16 retains items selected by a user from a source such as a website residing on the merchant servers 24. The wish list component 18 retains items that the user would like to have for a gift or items that the user would like to purchase but cannot locate. The shopping basket component 16 is also coupled to the ordering component 20 and the wish list component 18. The ordering component 20 allows for purchasing multiple items concurrently regardless of the server or site from which the item is described. Additionally, the shopping basket component 16 and the wish list component 18 are exposed to the merchant servers 24, so that any of the merchant servers with permission may access the wish list component 18 and/or the shopping basket 16 for programmability of the shopping basket system 12. Programmability of the shopping basket 12 is defined as the ability to access items on the user's wish list and the ability to provide items meeting the criteria defined by the user's wish list into the user's shopping basket. Programmability of the shopping basket 12 also provides for drag and drop capabilities of items into a user's shopping basket, which then retains information on the item or items.

Figure 2A:
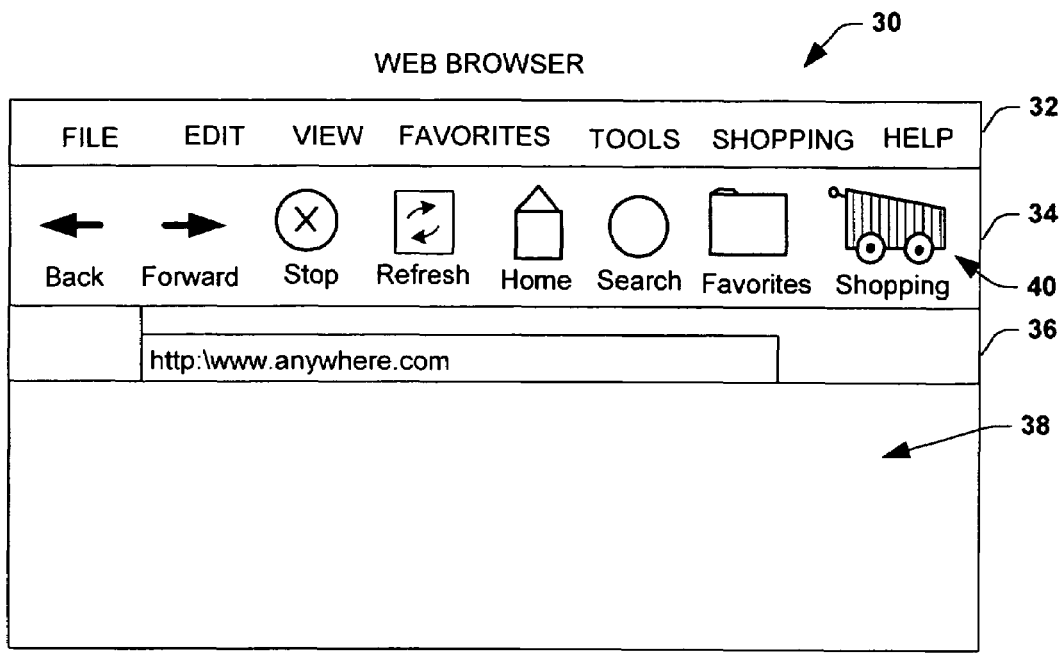
FIG. 2a illustrates a web browser employing the shopping basket system in accordance with one aspect of the present invention.

The shopping basket system 12 of the present invention may be employed on a standard web browser on a client computer. FIG. 2a illustrates a web browser 30 employing a shopping cart application of the present invention. The web browser 30 has a menu tool bar 32, a standard buttons tool bar 34 and an address tool bar 36. The web browser 30 also includes a window or pane 38 for viewing contents of web pages of various web sites. It is to be appreciated that the tool bars illustrated in FIG. 2a are used to provide an example of possible tool bars enabled in the browser 30 and various other toolbars may be enabled according to the particular browser being employed. The menu tool bar 32 includes a variety of pull down selection means for providing functionality to the browser 30. The standard button tool bar 34 includes a variety of different graphical images or icons for providing different functions to be utilized by a user of the browser 30, for example, by using a pointer such as a mouse.

Figure 2B:
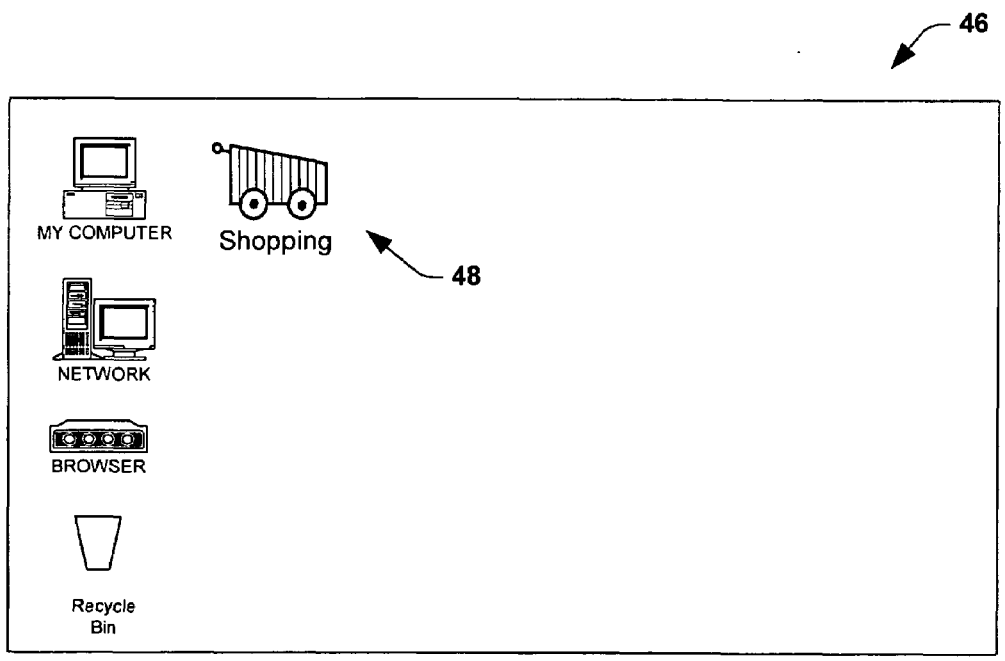
FIG. 2b illustrates a desktop employing the shopping basket system in accordance with one aspect of the present invention.

A shopping basket icon 40 is provided as one of the images illustrated in the standard buttons tool bar 34. The present invention allows for a user to select items of interest from various locations (e.g., web sites) and drag and drop items of interest into the shopping basket icon 40, which automatically adds the detail of the item to a user's shopping basket list. The details of the items can include, for example, source, price, date, item description, and other data necessary to close a transaction for purchase of the item(s). The user may view the list in the user's shopping basket by double clicking on the shopping basket icon 40, for example, by employing a computer pointer or by employing a sequence of keystrokes on a keyboard (e.g., a control key or function key). Alternatively, the user may employ the pull down list labeled "SHOPPING" on the pull down selection of the menu tool bar 32. The user can be prompted with a selection window (not shown), so that the user may select between adding the item to a shopping basket list or adding the item to a gift or wish list for others to view. FIG. 2b illustrates another implementation where a graphical image or icon 48 of a shopping basket resides on a computer desktop 46. Items of interest may be dragged from a user's browser and dropped into the shopping basket icon 48.

Figure 3A:
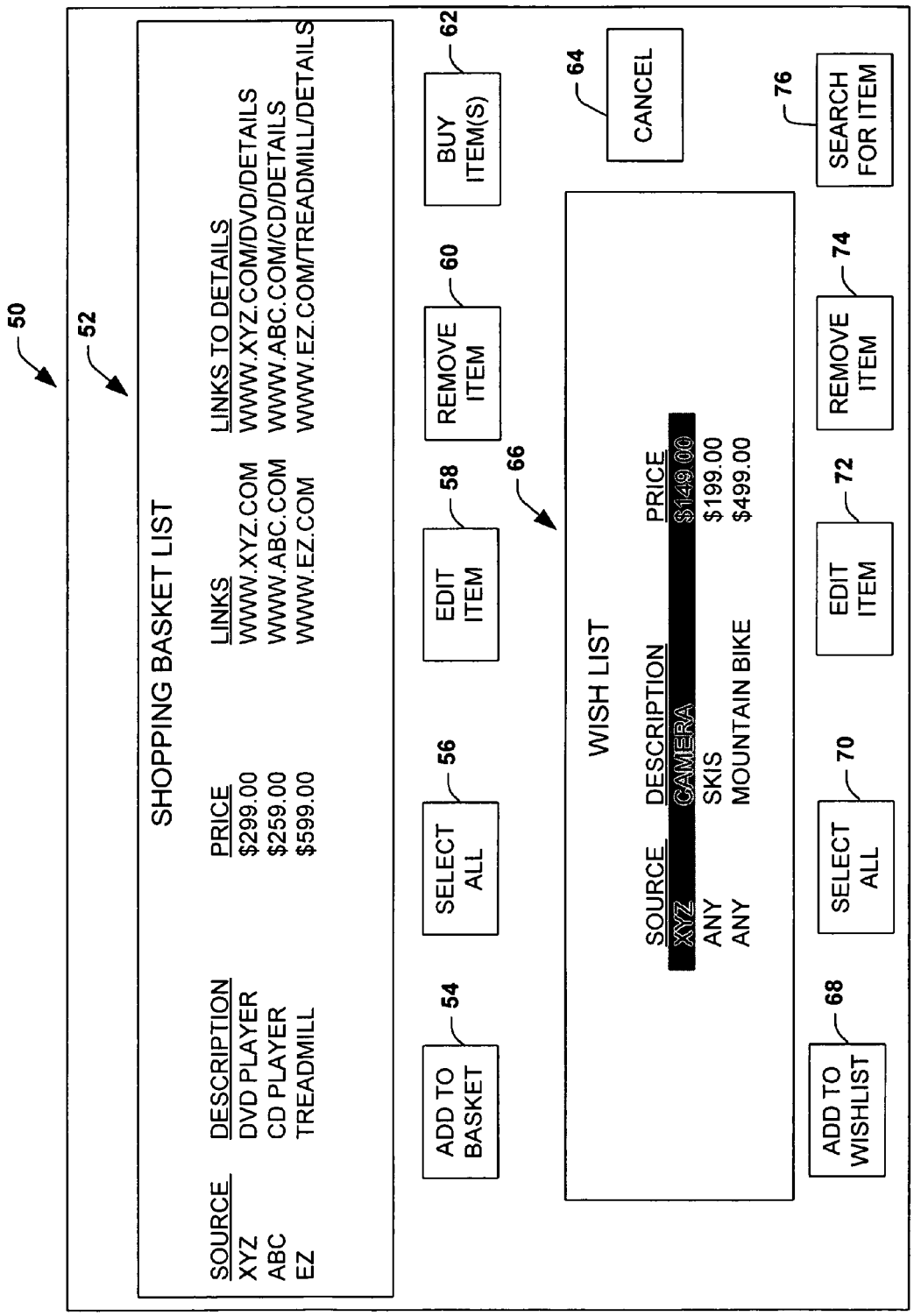
FIG. 3a illustrates an example of an input screen for adding items to a shopping basket list in accordance with one aspect of the present invention.
Figure 3B:
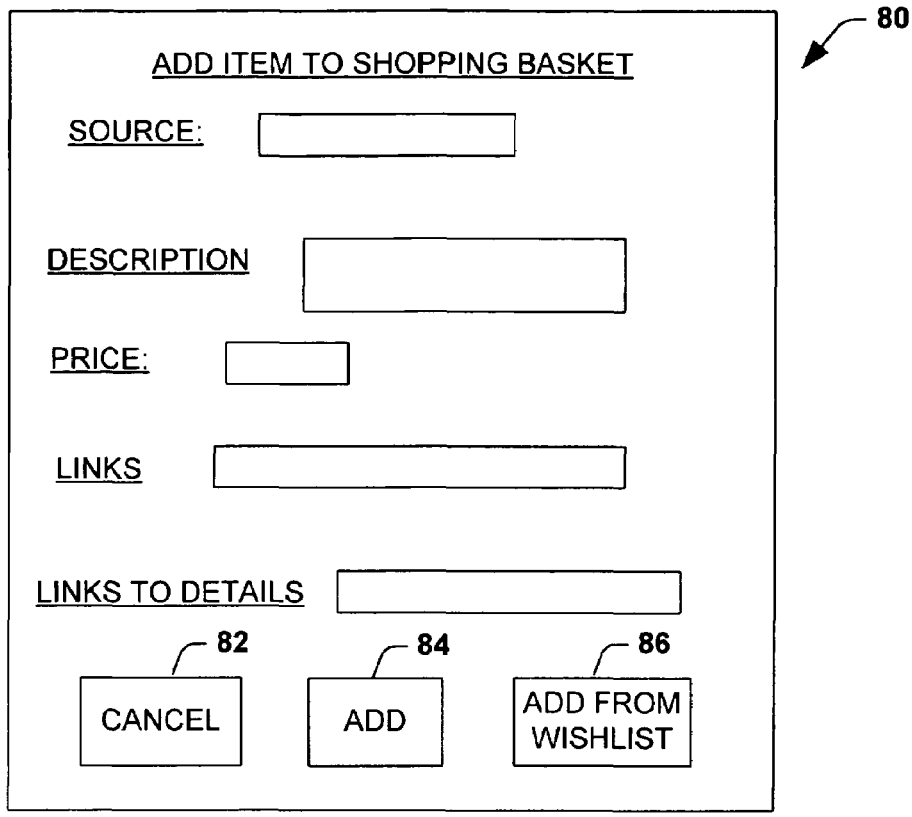
FIG. 3b illustrates an example of an input screen for adding items to a shopping basket list in accordance with one aspect of the present invention.

FIG. 3a illustrates an example of a possible user interface 50 that may be provided upon invocation of the shopping basket icon 40. The user interface 50 includes a shopping basket list 52 and a wish or gift list 66. The shopping basket list 52 includes a number of components describing each item such as source, item description, price, links and links to details about the item. The wish list 66 also includes a number of components describing items that a user would like to receive as a gift or would like to locate for purchasing. A number of buttons are provided for invoking functionality to the user interface 50 and the shopping basket system 12. For example, a user may wish to manually add a product to the shopping basket list 52 by clicking on an "ADD TO BASKET" button 54. An "ADD ITEM TO SHOPPING BASKET" input screen 80 is then provided as illustrated in FIG. 3b. A user may then add an item to the shopping basket list 52 by inputting information in the fields such as source name, description, price, links and links to details and then selecting the "ADD" button 84. The user may cancel the addition of an item to the shopping basket list 52 by selecting the "CANCEL" button 92.

The user may add items from the wish list 66 to the shopping basket list 52 by selecting the "ADD FROM WISHLIST" button 86, which will provide a user with a selection screen (not shown). The user may also add items from the wish list 66 to the shopping basket list 52 by dragging and dropping items from the wish list 66 to the shopping basket list 52. Furthermore, items may be edited, removed or bought by selecting the item via a pointer, such as a computer mouse, and selecting the buttons "EDIT ITEM" 58, "REMOVE ITEM(S)" 60 and "BUY ITEM(S)" 62, respectively. Additionally, all items may be remove from the list or all items may be concurrently purchased on the list by selecting the button "SELECT ALL" 56 and the respective button, "REMOVE ITEM(S)" 60 or "BUY ITEM(S)" 62.

Figure 3C:
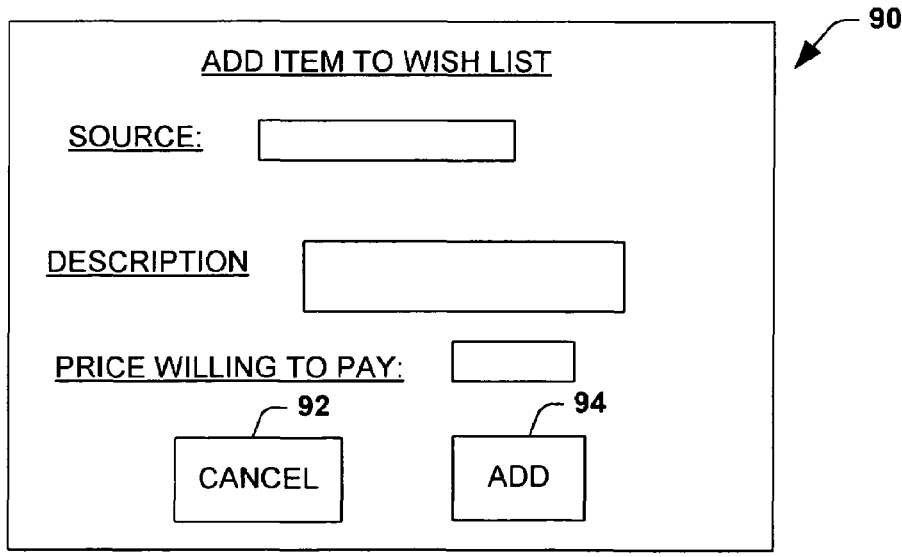
FIG. 3c illustrates an example of an input screen for adding items to a wish list in accordance with one aspect of the present invention.

A number of buttons are also provided for invoking functionality with respect to the wish list 66. For example, a user may wish to manually add an item to the wish list 66 by clicking on an "ADD TO WISHLIST" button 68. An "ADD ITEM TO WISHLIST" input screen 90 is then provided as illustrated in FIG. 3c. A user may then add an item to the wish list 66 by inputting information in the fields such as source name, description and the price the user is willing to pay then selecting the "ADD" button 94. The user may cancel the addition of an item to the wish list 66 by selecting the "CANCEL button 92. Furthermore, items may be edited or removed by selecting the item via a pointer, such as a computer mouse, and selecting the buttons "EDIT ITEM" 72 and "REMOVE ITEM(S)" 74, respectively. Additionally, all items may be removed from the list by selecting the button "SELECT ALL" 70 and the button "REMOVE ITEM(S)" 74.

In one aspect of the invention an item on the wish list may be selected and a search performed over the Internet (e.g., at registered merchant sites) for the item by selecting the item from the wish list 66 and selecting the button "SEARCH FOR ITEM" 76. In the present example of FIG. 3a, the user has selected to search for a camera made by XYZ that does not exceed the price of $149. FIG. 4 illustrates a results screen 100 produced from the search for a camera made by XYZ that does not exceed the price of $149. As can be seen from the results screen 100, three results have been returned. One result is from the web site of the manufacturer XYZ, another is from a web site of a distributor DEF selling XYZ cameras and another is from a web site selling a used XYZ camera. The user can then select one or more of the items and add it to the shopping basket list 52 by selecting the "ADD TO BASKET" button 102 or exit the results screen 100 by selecting the "CANCEL" button 104. FIG. 5 illustrates the interaction of the components employed to provide the search results 100. The shopping basket system 12 employs a search engine component 110, which transmits communications to one or more sources 120 on the Internet to find the desired item. The search engine component 110 then aggregates the results and sends them back to the shopping basket system 12 for display. A filtering system may be provided as part of the search engine component 110 to limit the number of potential sources of items and/or mitigate spam type of responses to the search.

Figure 6:
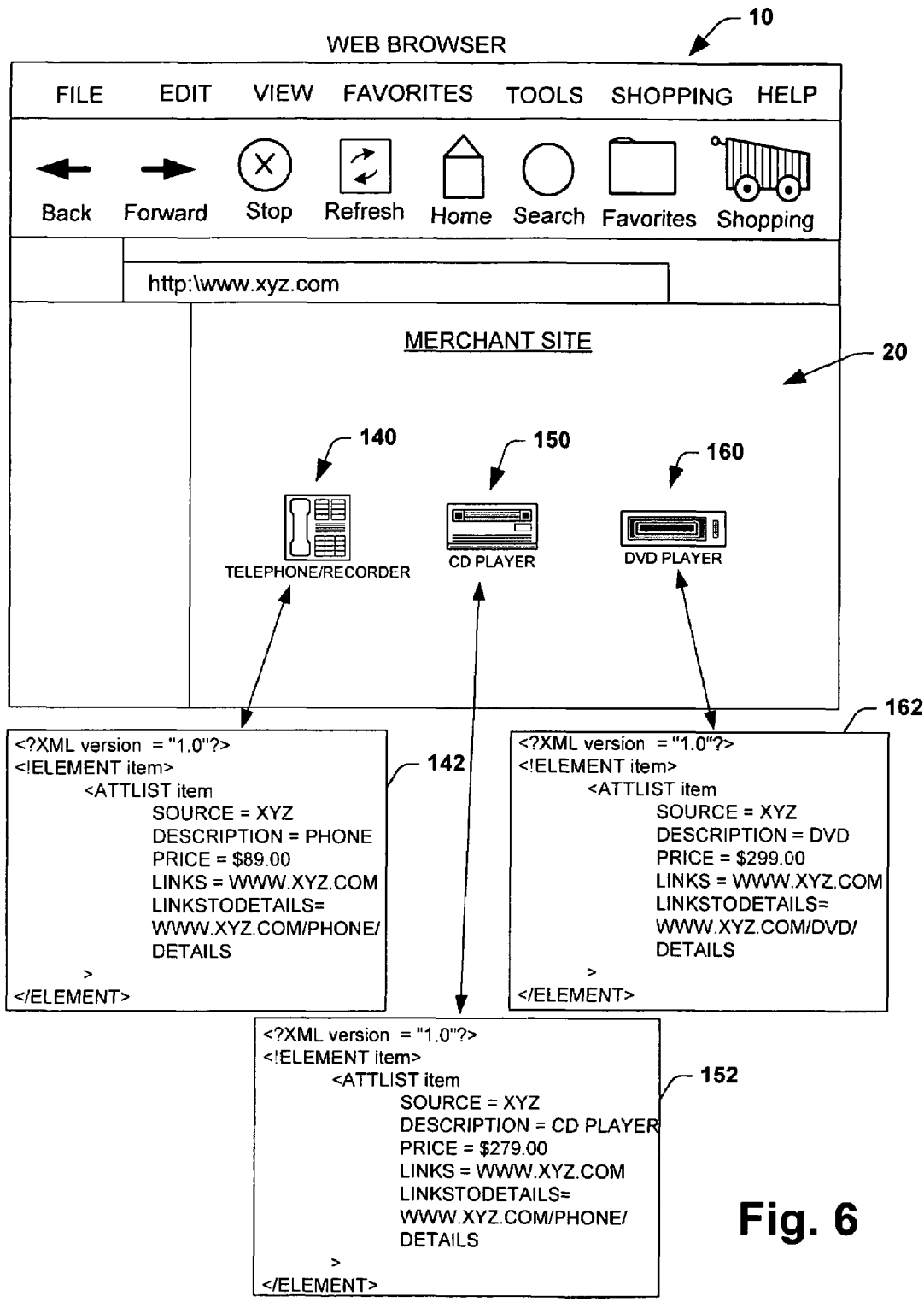
FIG. 6 illustrates the relation of representations of items to description of items employing a common schema at a merchant site in accordance with one aspect of the present invention.

FIG. 6 illustrates the methodology employed to provide drag and drop capabilities to the shopping basket system 12. Each merchant provides a graphical image or icon linked to a description file or a link that is linked to a description file. Each description file conforms to a common schema. In the present example, a merchant site is displayed in the window or pane 20 of the browser 10. The merchant site illustrates products by displaying images of the products on the web site. The images displayed in the present example include a telephone/recorder image 140, a CD player image 150 and a DVD player image 160. Each image is linked to a description file conforming to an XML schema. The telephone/recorder is linked to a first description file 142, the CD player 150 is linked to a second description file 152 and the DVD player 160 is linked to a third description file 162. Each of the description files has an element associated with the corresponding item and a list of attributes associated with that item (e.g., source, description, price, links and links to details). The common schema allows for drag and drop capabilities for the shopping basket system 12. It is to be appreciated that the present example is provided as a simple example of a common schema for the description files and one skilled in the art of computer programming would understand the additional complexities for adding additional attributes and/or functionality to the drag and drop capabilities of the present invention employing the common schema.

After all items of interest have been gathered and placed in the shopping basket list 52, the user can concurrently order all items (e.g., employing an authentication service for secure communications). FIG. 7 illustrates the interaction of the components employed in concurrent ordering of items utilizing the shopping basket system of the present invention. The ordering component in the shopping basket system 12 transmits a purchasing order to one or more sources 120 over the Internet. The shopping basket system 12 employs an authentication service 170, which transmits communications to one or more sources 120 on the Internet. The authentication service 170 interacts with the sources 120 so that the necessary information to complete the transaction is provided to the sources 120. Therefore, the user does not need to provide this information to each source separately.

In another aspect of the invention, the shopping basket system is programmable, such that any application program may access a user's shopping basket system and add products and/or services to the user's shopping basket list based on item's found in a user's wish list. The application programs may be resident on a merchant's server computer or on the user's computer. The shopping basket system may be resident on a client computer or a copy of the user's wish list and shopping basket list may reside on another computer to ensure the integrity of the client computer. Referring to FIG. 8, the shopping basket system 12 is provided with a plurality of application program interfaces (APIs) 190 that allows for substantially any application program 200 with the appropriate permission access to the shopping basket system 12. For example, a merchant may employ an application program to view the wish list of the user to determine products that the user would like to locate. The application program can then send a message to inform the user of where to find the item. Alternatively, the application program may place the item in the shopping list of the user, so that the user may easily purchase the item without undue searching. The wish list may also be accessed by queries by potential sources of the items. A filtering system 180 is provided so as to limit the number of potential sources of items and/or mitigate spam type of responses to view and/or query the wish list.

Figure 9:
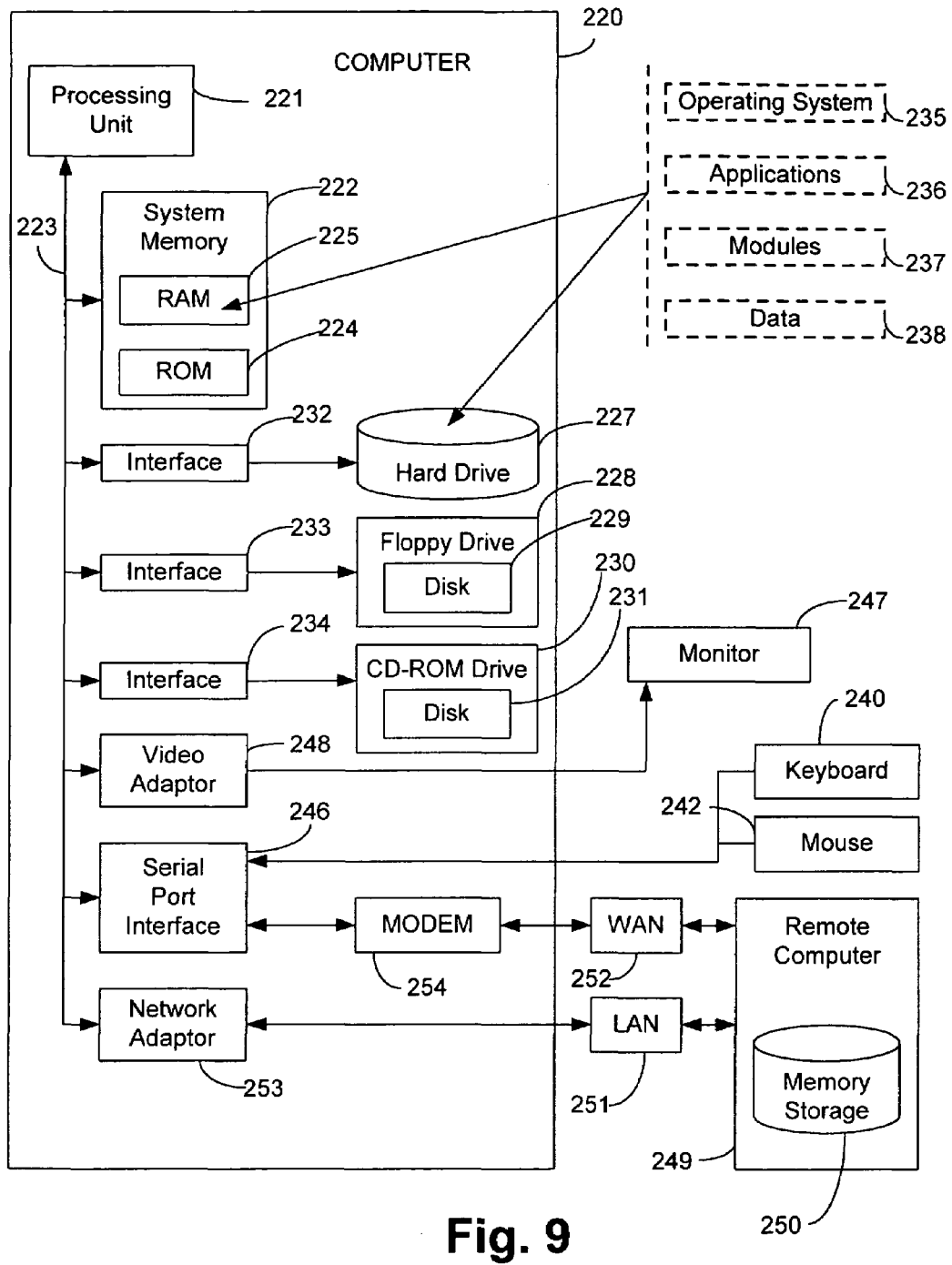
FIG. 9 illustrates a block diagram of a computer system in accordance with an environment of the present invention.

With reference to FIG. 9, an exemplary system for implementing the invention includes a conventional personal or server computer 220, including a processing unit 221, a system memory 222, and a system bus 223 that couples various system components including the system memory to the processing unit 221. The processing unit 221 may be any of various commercially available processors, including but not limited to Intel x86, Pentium® and compatible microprocessors from Intel and others, including Cyrix, AMD and Nexgen; Alpha® from Digital; MIPS® from MIPS Technology, NEC, IDT, Siemens, and others; and the PowerPC® from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, and program data 238. The operating system 235 in the illustrated computer is, for example, the Microsoft® Windows® NT, Microsoft® Transaction Server, Microsoft® Windows® 95, Microsoft® Windows® 98, Microsoft® Windows® 2000 or Microsoft® Windows® ME operating system, although it is to be appreciated that the present invention may be implemented with other operating systems or combinations of operating systems, such as UNIX, LINUX, etc.

A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote server or client computer 249. The remote computer 249 may be a workstation, a server computer, a router, a peer device or other common network node, and typically includes many or all of the elements described relative to the computer 220, although only a memory storage device 250 has been illustrated in FIG. 9. The logical connections depicted in FIG. 9 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregoing detailed description. It is intended that the invention be construed as including all such modifications alterations, and equivalents thereof.

What is claimed is:

1. A shopping basket system that facilitates electronic shopping, comprising:
    a shopping basket component that allows a user to select items from a plurality of different merchant servers and that allows the plurality of different merchant servers to access a wish list component on the user's computer to place one or more items corresponding to the wish list component into the shopping basket component; and
    an ordering component that allows concurrent purchasing of at least two selected items from at least two of the plurality of different merchant servers and that allows purchasing of items corresponding to the wish list component placed into the shopping basket component by the plurality of different merchant servers, wherein the shopping basket component, the ordering component and the wish list component are implemented by computer-executable instructions stored on computer-readable media configured to reside on the user's computer.

2. The shopping basket system of claim 1, wherein the items selected from the plurality of different merchant servers have a common schema associated with descriptions of the items.

3. The shopping basket system of claim 2, wherein the common schema is an XML schema.

4. The shopping basket system of claim 1, wherein the shopping basket component is a desktop application.

5. The system of claim 1, further comprising a filtering component configured to limit the number of the plurality of different merchant servers.

6. An application programming interface to facilitate interaction of the plurality of different merchant servers with the system of claim 1.

7. Computer-executable instructions for performing a method of facilitating electronic shopping, the computer-executable instructions stored on computer-readable media, the computer-executable instructions comprising:
    a shopping basket component configured to reside on a user interface on a user's computer, configured to facilitate identifying items from a plurality of different merchant servers for purchase and configured to facilitate allowing the plurality of different merchant servers to query an item list stored on the user's computer and to place items corresponding to the item list into the shopping basket component; and
    an ordering component configured to facilitate concurrent purchasing of two or more identified items from the plurality of different merchant servers and to facilitate purchasing items corresponding to the item list that are placed into the shopping basket component by the plurality of different merchant servers.

8. The computer-executable instructions of claim 7, wherein the items from the plurality of different merchant servers have a description conforming to an XML schema.

9. The computer-executable instructions of claim 7, wherein the shopping basket component have drag and drop capabilities.

10. The computer-executable instructions of claim 9, wherein the user interface is one of an Internet browser and a desktop application.

11. The computer-executable instructions of claim 7, further comprising a filtering component configured to limit the number of the plurality of different merchant servers.

12. The computer-executable instructions of claim 7, wherein the method is implemented at least in part by an application programming interface.

* * * * *